UNITED STATES PATENT OFFICE.

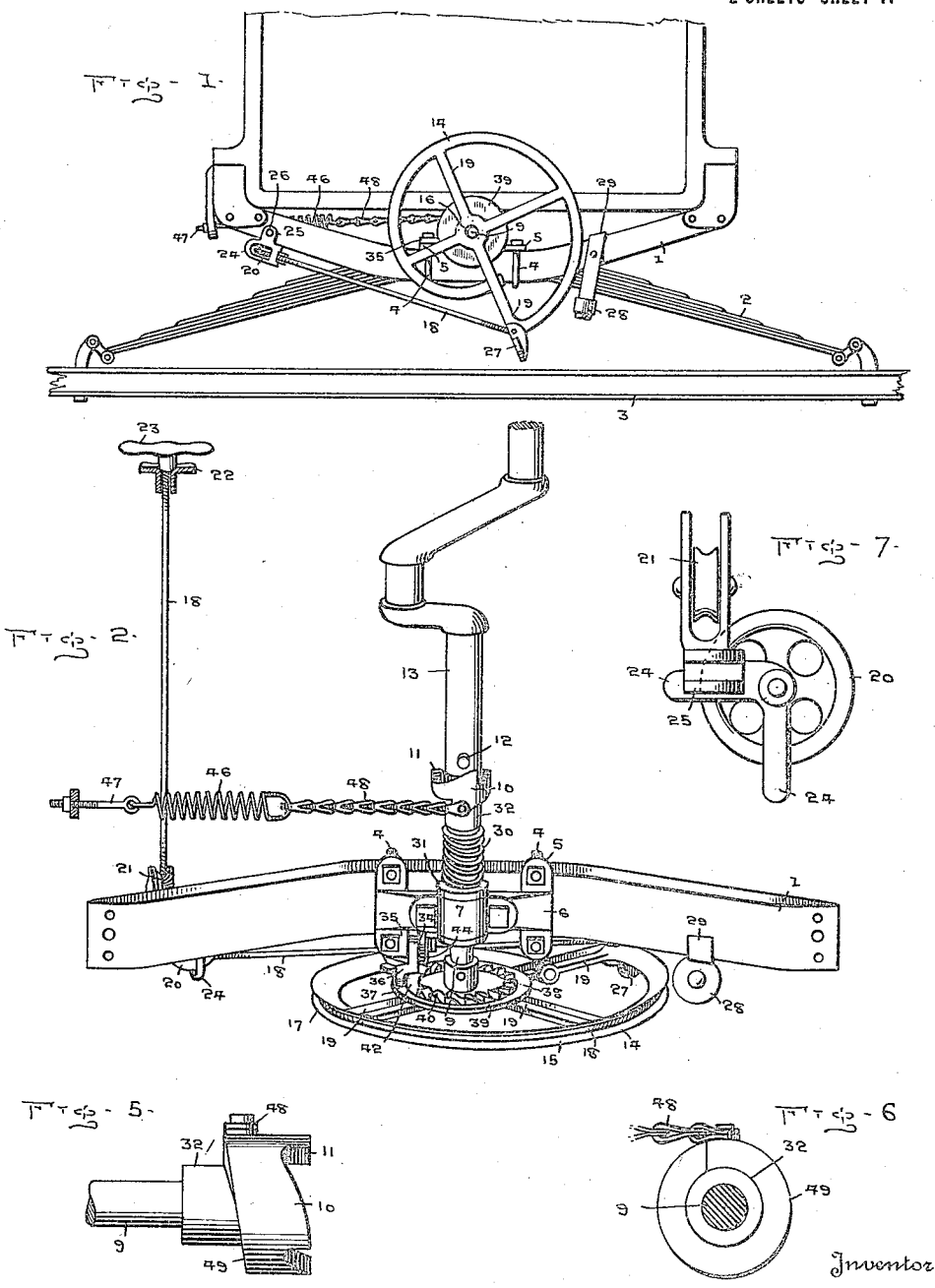

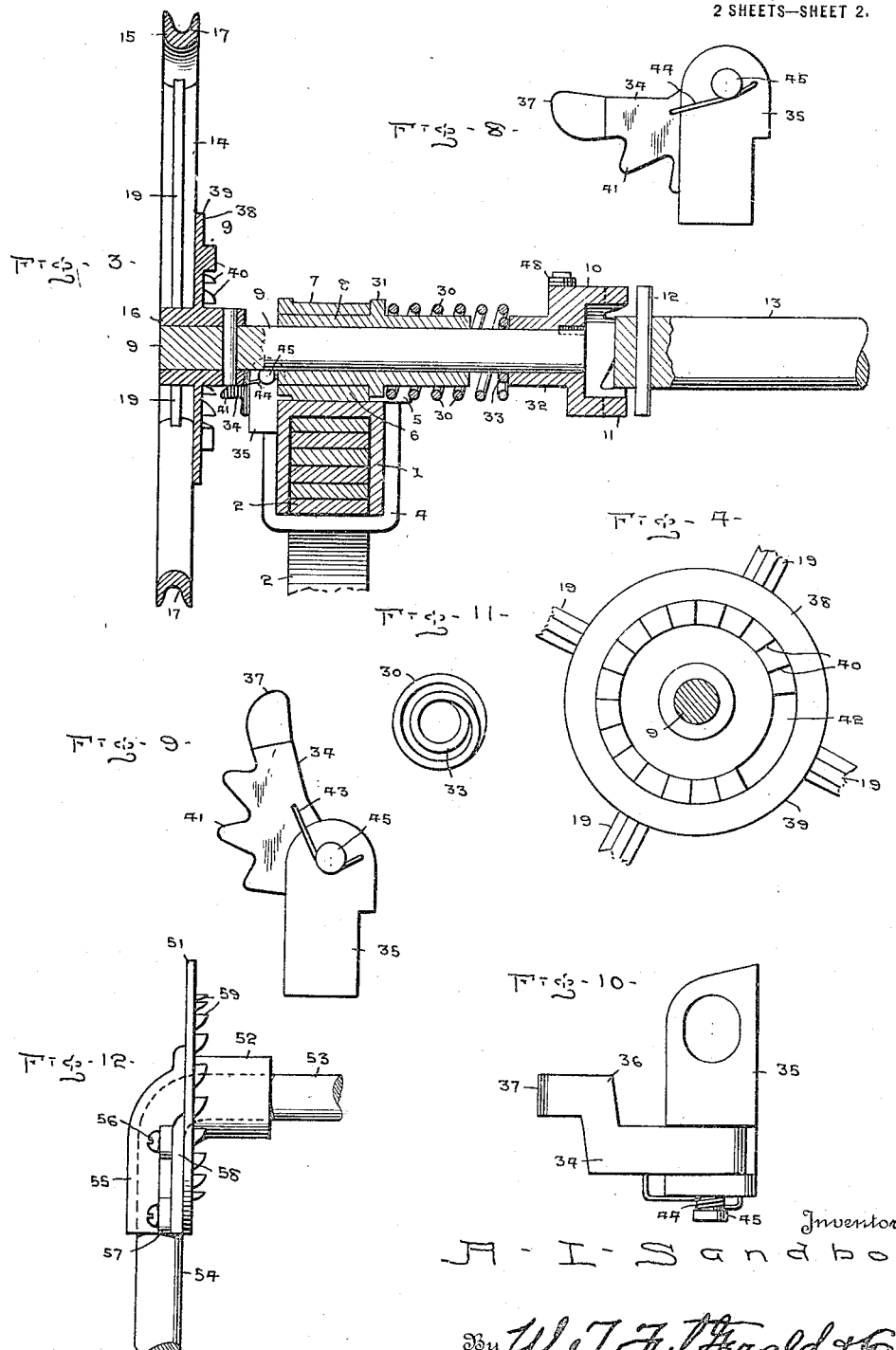

ANTON I. SANDBO, OF ROCK ISLAND, ILLINOIS.

ENGINE-STARTER.

1,229,148.  Specification of Letters Patent.  Patented June 5, 1917.

Application filed May 16, 1916. Serial No. 97,807.

*To all whom it may concern:*

Be it known that I, ANTON I. SANDBO, a citizen of the United States, residing at Rock Island, in the county of Rock Island and State of Illinois, have invented certain new and useful Improvements in Engine-Starters; and I do hereby declare the following to be a full, clear, and exact description of the invention, such as will enable others skilled in the art to which it appertains to make and use the same.

My invention relates to new and useful improvements in engine starters and more particularly to that class adapted to be used for starting internal combustion engines used upon motor propelled vehicles, such as automobiles, and the like, and my object is to provide a clutch mechanism adapted to coöperate with the crank shaft of the motor for imparting rotating motion thereto.

A further object is to provide means whereby the clutch mechanism may be manually rotated from the seat of the vehicle.

A further object is to provide means for normally holding the clutch mechanism out of engagement with the crank shaft.

A further object is to provide means for releasing the clutch mechanism from the crank shaft when the crank shaft is reversely rotated.

A further object is to provide means for moving the clutch mechanism into engagement with the crank shaft.

And a further object is to provide means for returning the clutch mechanism and parts attached thereto to their initial position after the same has been operated to rotate the crank shaft.

Other objects and advantages will be hereinafter set forth and more particularly pointed out in the accompanying specification.

In the accompanying drawings which are made a part of this application,

Figure 1 is an elevation of a portion of the front end of an automobile showing my improved starting device attached thereto.

Fig. 2 is a perspective view of the starting mechanism removed from the automobile.

Fig. 3 is an enlarged sectional view through the starting mechanism.

Fig. 4 is a plan view of a portion of the inner face of the throwing wheel showing the clutch carrying shaft in section.

Fig. 5 is a side elevation of the clutch.

Fig. 6 is an end elevation thereof.

Fig. 7 is a top plan view of the supporting sheaves from the wheel controlling cable.

Fig. 8 is a side elevation of the clutch releasing pawl showing the pawl in position to hold the clutch out of engagement with the crank shaft.

Fig. 9 is a similar view showing the position of the pawl when the clutch is in engagement with the crank shaft.

Fig. 10 is a top plan view of the pawl and its support showing the pawl in lowered position.

Fig. 11 is an end elevation of the spring employed for moving the clutch into engagement with the crank shaft, and Fig. 12 is an elevation of a portion of a crank showing the manner of attaching the clutch releasing mechanism thereto.

Referring to the drawings in which similar reference numerals designate corresponding parts throughout the several views, 1 indicates the front frame bar of an automobile which is preferably channel shaped, to which is attached a spring 2, the ends of the spring being in turn attached in any suitable manner to the axle 3 of the vehicle.

The spring 2 is secured to the frame bar 1, preferably by means of U-shaped bolts 4, the free ends of which extend upwardly through ears 5, of a clamping plate 6, said plate resting upon the upper face of the frame bar 1, while the bolts pass around the frame bar and that portion of the spring seated therein, said plate having a boxing 7 thereon, through which extends a sleeve 8, said sleeve forming a bearing for a shaft 9, to the inner end of which is keyed a clutch 10, the notched face 11 of which is adapted to coöperate with a pin 12 carried by the end of the crank shaft 13. The shaft 9 and clutch 10 are rotated in one direction by attaching a throwing wheel 14 to the forward end of the shaft 9, the rim 15 of the throwing wheel being eccentrically or spirally arranged around its hub 16, said rim having a channel 17 in its peripheral face in which is seated a pull cable 18, that end of the cable, engaging the rim at its smallest circumference, being attached in any suitable manner to one of the spokes 19 of the throwing wheel, while the opposite end of the cable extends around a sheave 20 and below a sheave 21 to the dash 22, or other suitable point adjacent the forward seat of the vehicle, said latter end of the cable having a hand grip 23 attached thereto which may be readily grasped to give a rotating movement to the throwing wheel.

The sheaves 20 and 21 are rotatably mounted in a bracket 24, which bracket is fixed to the frame bar 1 by providing ears 25 upon the bracket which are secured to the frame bar by rivets 26, or other suitable means, the end of the rim 15 having the smallest circumference and the end of the rim having the greatest circumference terminate at the same spoke of the wheel, said ends being preferably integral with the spoke so that the wheel can be given a complete rotation if desired, thus compressing two or more of the cylinders with one full rotation of the wheel. The rotation of the wheel in one direction is limited by placing a projection 27 on the rim of the wheel at the point of its greatest circumference, which projection engages a bumper 28 when the wheel has been given a complete rotation, said bumper being suspended by a strap 29 from the frame bar 1.

In order to move the shaft 9 inwardly to bring the notched face of the clutch in engagement with the pin of the crank shaft, when the throwing wheel is rotated in one direction, a coil spring 30 is employed, one end of the spring extending around the projecting end of the sleeve 8 and abutting against a collar 31 formed on the periphery of the sleeve, while the opposite end of the spring engages a hub 32 of the clutch 10, the last coil 33 at the inner end of the spring 30, being reduced in diameter so as to fit around the shaft 9 and bear against the end of the hub 32.

The clutch 10 is normally held out of engagement with the crank shaft by providing a pawl 34, one end of which is pivotally attached to a bracket 35, said bracket being in turn attached to one of the bolts 4 at one side of the shaft 9, the outer end of the pawl having an offset portion 36 which terminates in a forwardly extending finger 37, the end of the finger being rounded and adapted to travel over the face 38 of a disk 39, said disk being preferably formed integral with the spokes of the throwing wheel 14, the length of the finger being such that when extending in a horizontal position the clutch 10 will be out of engagement with the pin of the crank shaft.

When a pull is given the cable 18 to rotate the throwing wheel 14, the finger 37 moves upwardly as well as slides over the face of the disk 39 until said pawl rests in substantially a vertical position, thereby permitting the clutch to be moved into engagement with the pin 12 of the crank shaft by the pressure of the spring against the hub of the clutch, said clutch remaining in engagement with the pin so long as the pawl remains in a vertical position.

In order to instantly release the clutch from the crank shaft, should a back fire or a reverse rotation of the crank shaft from any cause occur, a plurality of teeth 40 are arranged in a circular path on the face of the disk 39, a distance from the peripheral edge of the disk, with which coöperate teeth 41 on the under face of the pawl 34, one face of each tooth 40 being beveled or rounded so that the teeth 41 will readily ride thereover when the throwing wheel is operated to rotate the crank shaft; while the opposite faces thereof are at right angles to the face of the disk whereby they will instantly engage the teeth 41 and cause the pawl to move to a horizontal position when the throwing wheel is reversely rotated, thereby disengaging the clutch from the crank shaft.

To permit the pawl 34 to readily assume a substantially vertical position when the throwing wheel is first operated, a certain number of the teeth 40 are omitted from the circle and a depression 42 formed in the face of the disk 39 into which the teeth 41 enter as the pawl is being moved upwardly, thus preventing the teeth 41 from engaging any of the teeth 40 to retard the upward swinging movement of the pawl. The pawl 34 is held in engagement with the disk at all times by means of a tension spring 43, one end of the spring being attached to the bracket 35, while the opposite end thereof is attached to the pawl 34, said spring, between its ends, having a coil section 44 which extends around the pivot pin 45 employed for securing the pawl to the bracket.

In order to return the throwing wheel 14 to its initial position after it has been operated to rotate the crank shaft, any suitable means may be employed but preferably a spring 46, one end of which is attached to the frame of the car by means of an eye bolt 47, while the opposite end thereof is attached to the peripheral surface of the clutch 10 by means of a chain 48, said chain being preferably substantially flat whereby it will readily wind around the hub of the clutch.

In order to wind the chain upon the clutch and at the same time reduce the force of the tension of the spring 46 against the pull upon the cable 18, to the minimum, the end of the clutch adjacent the hub 32 is cut away to the diameter of the hub so that the chain will wind directly upon the hub instead of upon the peripheral surface of the clutch, the end wall 49 of the clutch adjacent the hub, being spirally arranged whereby the chain will be moved laterally while being wound upon the hub, the pull of the spring being proportional to its tension.

In operating this form of device, the occupant of the forward seat of the automobile grasps the hand grip 23 and directs an outward pull on the cable 18, thereby rotating the throwing wheel 14, the first movement of the wheel causing the pawl 34 to swing upwardly, whereupon the spring 30 will throw the clutch 10 into engagement with the pin 12 of the crank shaft, the continued rotation of the throwing wheel resulting in the rotation of the crank shaft. As soon as the engine is started, the pull upon the hand grip 13 is released, whereupon the tension of the spring 46 will reverse the rotation of the throwing wheel and the shaft to which it is attached, thereby causing the latch of the pawl 34 to descend and move the clutch out of engagement with the crank pin. Should the first rotation of the throwing wheel fail to start the engine the cable may be continuously moved inwardly and outwardly until the engine is started, the operator, after making one pull, releasing the cable until the throwing wheel returns to its initial starting position, then giving another outward pull to the cable.

In Fig. 12 of the drawings, I have shown the clutch releasing mechanism as applied to the ordinary engine starting crank, and in this instance, the disk 51 is provided with a sleeve 52 which fits over the horizontal portion 53 of the crank, the outer face of the disk being moved into engagement with the vertical portion 54 of the crank and secured thereto by introducing a housing 55 over the vertical portion 54 and clamping the same in position thereover by introducing screws 56 through ears 57 on the housing and into fillets 58 on the outer face of the disk 51, the teeth 59, on the disk 51, being arranged similar to the teeth 40 of the disk 39.

In this instance of course the crank is manually forced inwardly to engage the clutch with the crank shaft, the pawl acting in the same manner as when coöperating with the throwing wheel.

This device can be readily applied to use and installed upon the car, either when the car is manufactured or at any subsequent time, and in view of its simplicity can be installed at a minimum expense.

It will likewise be seen that the amount of energy required to operate the throwing wheel will be greatly reduced in view of the formation of the throwing wheel, and by constructing the rim of the wheel in spiral formation two or more of the pistons of the machine will be brought under compression with one complete rotation of the throwing wheel.

I claim:—

1. The combination with the crank shaft of an engine, of a clutch mechanism, means carried by parts of said clutch mechanism and formed with a depression and having a plurality of teeth arranged in circular formation thereon with a number of the teeth omitted, a movably mounted toothed member for coöperation with said teeth and having means adapted to travel over the face of said first-named means, the teeth of said movably mounted member adapted to enter said depression during one movement.

2. The combination with the crank shaft of an engine, of a clutch, a portion of said clutch being reduced in diameter to form a hub, the end of the clutch adjacent the hub being spirally arranged, a spring, means to anchor one end of the spring, and means to attach the opposite end of the spring to the clutch whereby when the clutch is rotated the spring securing means between the clutch and end of the hub of the spring will be wound upon the hub, and a spring having its terminal coil reduced in diameter to fit around the shaft and bear against the end of said hub.

3. The combination with a clutch mechanism, and means to move the clutch mechanism into operative position, of a throwing wheel for the clutch, a disk on said throwing wheel, teeth arranged in circular formation on the disk, a pawl having a finger at one end adapted to engage the face of the disk until the pawl assumes a vertical position, to hold the clutch in inoperative position, and teeth on the pawl adapted to engage the teeth of the disk whereby the pawl will be operated upon the occurrence of reverse rotation to force the clutch into inoperative position, the teeth of said disk being interrupted as and for the purpose set forth.

4. The combination with the crank shaft of an engine, of a clutch mechanism, a disk carried by parts of said clutch mechanism, a plurality of teeth arranged in circular formation on said disk, said disk having a depression, a pivotally mounted pawl having teeth adapted to coöperate with the teeth of the disk, an angular extension on said pawl, and a forwardly extending finger at the end of the extension adapted to travel over the face of the disk, the teeth of the pawl being adapted to enter said depression when the pawl is being moved to a vertical position.

5. The combination with the crank shaft of an engine, of a clutch mechanism, a disk carried by parts of said clutch mechanism, said disk having a plurality of teeth arranged in circular formation thereon with some of the teeth omitted, and said disk formed with a depression, a pivotally mounted pawl having teeth for coöperation with the teeth of said disk, said pawl having an angular extension adapted to travel over the face of the disk, the teeth of the pawl being adapted to enter said depression as the pawl is being moved upwardly, and means for holding the pawl into its engagement with the disk at all times.

In testimony whereof I have signed my name to this specification.

ANTON I. SANDBO.